United States Patent
Annampedu et al.

(10) Patent No.: US 6,813,108 B2
(45) Date of Patent: Nov. 2, 2004

(54) SERVO DATA DETECTION IN PRESENCE OF RADIAL INCOHERENCE USING MULTIPLE DATA DETECTORS

(75) Inventors: Viswanath Annampedu, Allentown, PA (US); Pervez Mirza Aziz, Garland, TX (US)

(73) Assignee: Agere Systems Inc., Allentown, PA (US)

( * ) Notice: Subject to any disclaimer, the term of this patent is extended or adjusted under 35 U.S.C. 154(b) by 413 days.

(21) Appl. No.: 09/999,303

(22) Filed: Oct. 31, 2001

(65) Prior Publication Data

US 2003/0099052 A1 May 29, 2003

Related U.S. Application Data

(60) Provisional application No. 60/335,143, filed on Oct. 24, 2001.

(51) Int. Cl.$^7$ .................................................. G11B 5/09
(52) U.S. Cl. ........................ 360/51; 360/49; 360/77.08; 360/78.14
(58) Field of Search .............................. 360/51, 32, 49, 360/46, 39, 77.08, 78.14; 714/789, 794, 795, 701, 769, 770; 375/262, 263, 341, 354, 355, 362

(56) References Cited

U.S. PATENT DOCUMENTS

6,067,198 A * 5/2000 Zuffada et al. ................ 360/46
6,480,984 B1 * 11/2002 Aziz ........................... 714/795

OTHER PUBLICATIONS

U.S. patent application Ser. No. 09/338,104, Aziz, filed Jun. 23, 1999, "Rate (M/N) Code Encoder, Detector, and Decoder for Control Data".

* cited by examiner

*Primary Examiner*—Alan T. Faber

(57) ABSTRACT

Techniques for detecting control data, such as servo data, from input or incoming data read from a magnetic recording medium in the presence of radial incoherence are provided. More specifically, the techniques employ multiple (i.e., two or more) data detectors for choosing between multiple sampling phases associated with the input data read from the magnetic recording medium. In the context of servo data detection, such techniques offer several orders of magnitude in performance improvement in detecting SAM and Gray data in the presence of RI and may advantageously be employed in a read channel integrated circuit. Furthermore, such techniques may be applied to any data encoding system.

22 Claims, 4 Drawing Sheets

SERVO DATA DETECTION IN PRESENCE OF RADIAL INCOHERENCE USING MULTIPLE DATA DETECTORS

CROSS REFERENCE TO RELATED APPLICATION

The present application claims priority to the U.S. provisional patent application identified by U.S. Ser. No. 60/335,143, filed on Oct. 24, 2001, and entitled "Methods for Improving Servo Data Detection Performance in the Presence of Radial Incoherence," the disclosure of which is incorporated by reference herein.

FIELD OF THE INVENTION

The present invention generally relates to techniques for use in magnetic recording systems and, more particularly, to techniques for performing servo data detection in the presence of radial incoherence.

BACKGROUND OF THE INVENTION

A read channel integrated circuit (IC) is one of the core electronic components in a modem magnetic recording system such as a hard disk drive. A read channel converts and encodes data to enable the heads to write data to the disk drive and then read back the data accurately. The disks in a drive typically have many tracks on them. Each track typically consists of mostly user or "read" data sectors, as well as control or "servo" data sectors embedded between the read sectors. The servo sectors help to position the magnetic recording head on a track so that the information stored in the read sectors is retrieved properly.

A typical magnetic recording system includes some mechanism for detecting servo data. However, a problem that inhibits the ability of such a detecting mechanism to reliably detect servo data during a disk seek is a condition referred to as "radial incoherence." Radial incoherence (RI) refers to the offset in timing between radially adjacent servo tracks. From a signal processing point of view, quick phase changes and some signal loss are characteristics of RI.

Thus, in magnetic recording systems, there is a need for techniques which improve servo data detection performance in the presence of radial incoherence.

SUMMARY OF THE INVENTION

The present invention provides techniques for detecting control data, such as servo data, from input or incoming data read from a magnetic recording medium, preferably in the presence of radial incoherence. More specifically, the techniques employ multiple (i.e., two or more) data detectors for choosing between multiple sampling phases associated with the input data read from the magnetic recording medium.

In one aspect of the invention, such a technique for detecting control data from input data stored on a recording medium comprises the following steps. First, the input data read from the recording medium is respectively sampled at two or more predetermined phases, i.e., samples are respectively generated from the input data at the two or more predetermined phases. The input data sampled at the two or more predetermined phases is then respectively applied to two or more data detectors. Then, output data from one of the two or more data detectors is identified as detected control data based on a predetermined detection criterion.

In the context of servo data detection, the predetermined detection criterion comprises identifying output data from the first data detector to detect a servo address mark in the input data. The two or more predetermined phases used to sample the input data may comprise a nominal phase and at least one phase other than the nominal phase. In one embodiment, the at least one phase other than the nominal phase is spaced T apart from the nominal phase, where T is a nominal spacing associated with input samples. In another embodiment, the at least one phase other than the nominal phase is spaced a multiple of T apart from the nominal phase. In yet another embodiment, the at least one phase other than the nominal phase is spaced a fraction of T apart from the nominal phase. Still further, the two or more data detectors may be partial response maximum likelihood detectors such as Viterbi decoders.

Such servo detection techniques offer several orders of magnitude in performance improvement in detecting servo data in the presence of RI and may advantageously be employed in a read channel integrated circuit. Furthermore, such techniques may be applied to any servo encoding system.

Advantageously, for a given level of performance, the servo data detection techniques of the present invention improve seek time in magnetic recording systems. That is, since the techniques of the invention handle radial incoherence effectively, faster disk seeks are possible. Also note that for a given level of performance, tracks can be written closer and the disks can be spun faster with the application of techniques of the present invention. Thus, as will be explained in detail below, the invention advantageously exploits the use of multiple data detectors in the presence of quick phase changes in order to provide improved servo data detection performance.

It is to be understood that since writing data to, storing data in, and reading data from a magnetic recording medium may be considered a transmission channel that has an associated frequency response, the techniques of the present invention are more generally applicable to any digital transmission systems such that detection of digital data represented by a sequence of symbols, where each symbol may be made up of a group of bits, may be improved.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

The present invention will be explained below in the context of an illustrative magnetic recording system embodiment. However, it is to be understood that the present invention is not so limited. Rather, as will be evident, the techniques of the invention may be more generally applied to improve digital data detection in any data encoding system or, more generally, in any digital transmission system, particularly in the presence of sampling phase incoherence.

The detailed description will first describe and illustrate an exemplary magnetic recording system employing a servo encoding system which may be modified to implement the techniques of the present invention in order to mitigate and/or eliminate the effects of RI. The detailed description will then describe and illustrate a magnetic recording system in accordance with one embodiment of the present invention.

Figure 1:
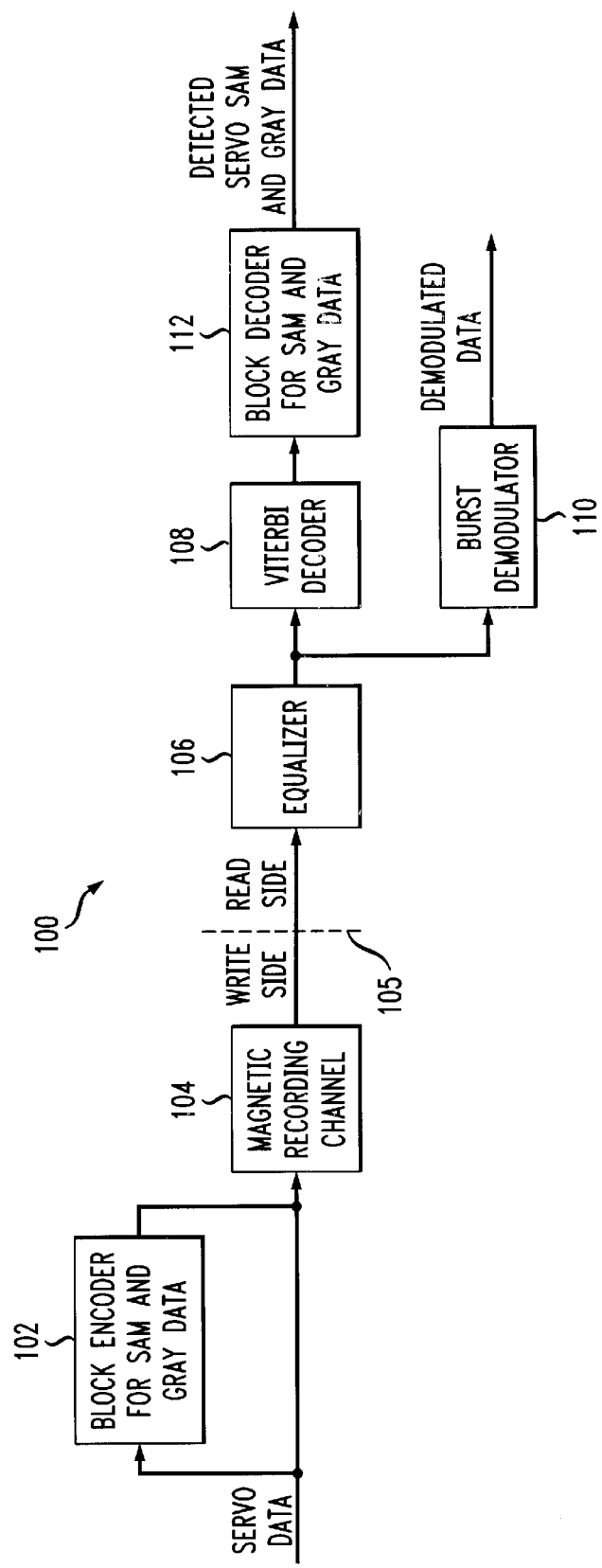
FIG. 1 is a block diagram illustrating an exemplary magnetic recording system which may be modified to implement the techniques of the present invention.

Referring initially to FIG. 1, an exemplary magnetic recording system is illustrated, particularly focusing on the components involved in servo data processing, which (as will be further explained and illustrated) may be modified to implement the techniques of the present invention. As shown, a magnetic recording system 100 may comprise a servo data block encoder 102, a magnetic recording channel 104, an equalizer 106, a Viterbi decoder 108, a burst demodulator 110, and a servo data block decoder 112. As is known, magnetic recording systems such as the one illustrated in FIG. 1 employ digital signal processing to detect servo data, as compared with older systems which employ analog techniques.

Figure 2:
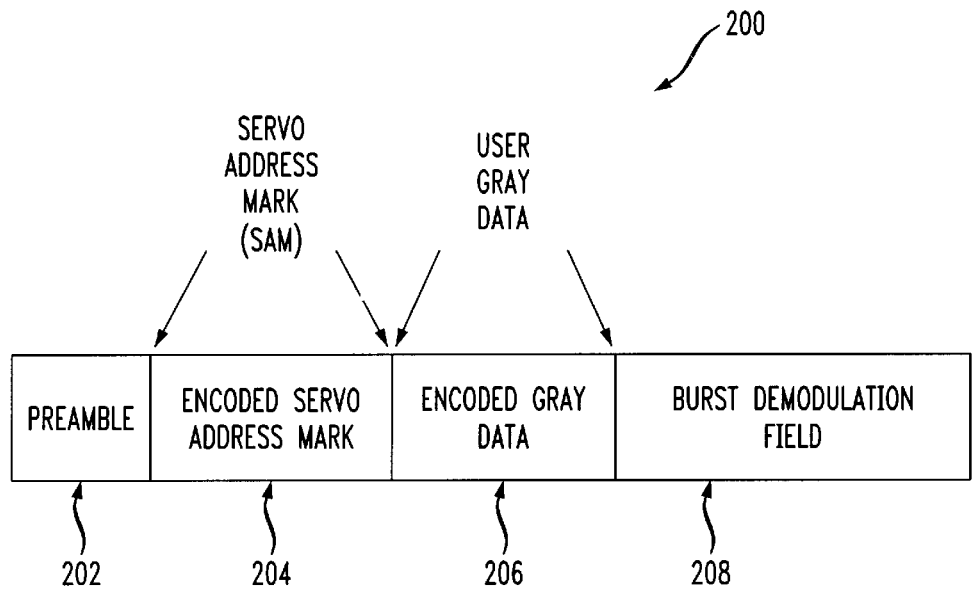
FIG. 2 is a diagram illustrating a servo data format.

FIG. 2 illustrates a data format 200 of a servo sector. As shown, a servo sector may comprise a preamble 2T pattern 202 which allows the system to recover the timing and gain of the written servo data. The preamble is typically followed by a servo address mark (SAM) 204 which is the same for all servo sectors. The SAM is then followed by encoded servo Gray data 206. The Gray data is followed by several burst demodulation fields 208.

The SAM 204 typically comprises some fixed number of bits. The Gray data 206 represents the track number/cylinder information and serves as a coarse positioning for the magnetic head of the recording system. The burst demodulation fields 208 serve as a fine positioning system for the head to be on track.

Thus, with reference back to FIG. 1, on the write side of operations, servo data is encoded by the block encoder 102 and written to a magnetic medium such as a disk (denoted as 105) via the magnetic recording channel 104. Portions of the servo data that are not encoded may also be written to the medium 105. It is understood that a magnetic write head, while not expressly shown, is functionally interposed between the magnetic recording channel 104 and the magnetic medium 105 for writing data to the medium. On the read side of operations, the servo data is read from the magnetic medium 105 via a magnetic read head (not expressly shown but understood to be functionally interposed between the medium 105 and the equalizer 106) and then equalized in accordance with the equalizer 106. The servo data is then sampled at a nominal sampling rate (not shown) and detected by the Viterbi decoder 108. The Gray data portion of the detected servo data is then decoded by the block decoder 112 during a seek mode, while the burst demodulation field portion of the servo data is demodulated by the burst demodulator 110.

As mentioned above, RI inhibits the ability of a data detector such as the Viterbi decoder 108 to reliably detect SAM and Gray code during a seek. Again, RI refers to the offset in timing between radially adjacent servo tracks and, from a signal processing perspective, is characterized by quick phase changes and some signal loss.

Figure 3:
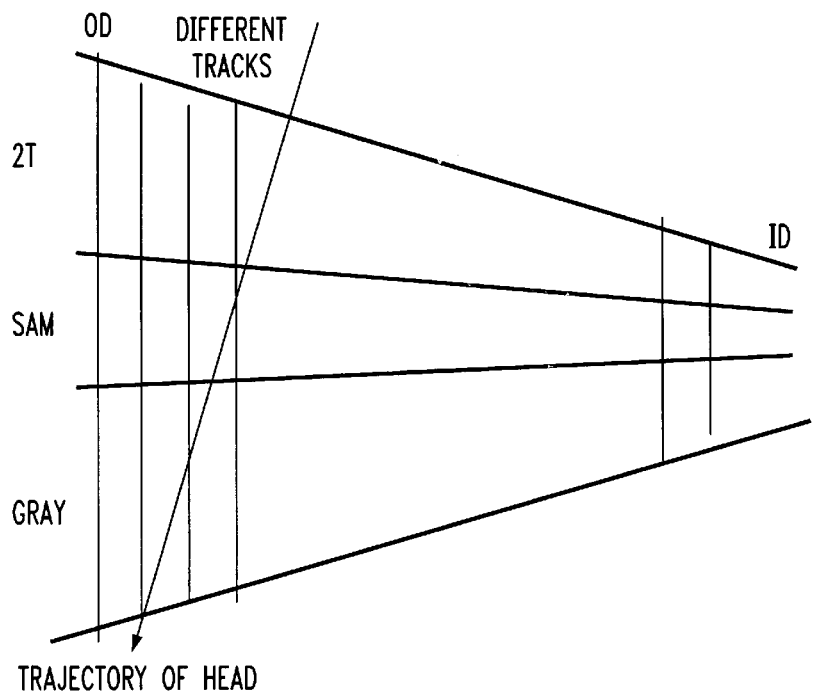
FIG. 3 is a diagram illustrating trajectory of a magnetic head during a seek mode.

The higher the velocity of a "seek," the more the adverse effects of RI. The trajectory of a head while seeking is illustrated in FIG. 3. Evident from this figure is the fact that the head picks up signals from adjacent tracks. As shown, "ID" refers to the inner diameter and "OD" refers to the outer diameter of the circular magnetic disk. The vertical lines represent different servo tracks. The slanting line with an arrow represents the path or trajectory that the magnetic head would see over time when the disk is spinning. The greater the velocity of the spin, the greater the slope of this line. As can be seen from the figure, since the head crosses different tracks over time, the head picks up signals from those different tracks.

Figure 4:
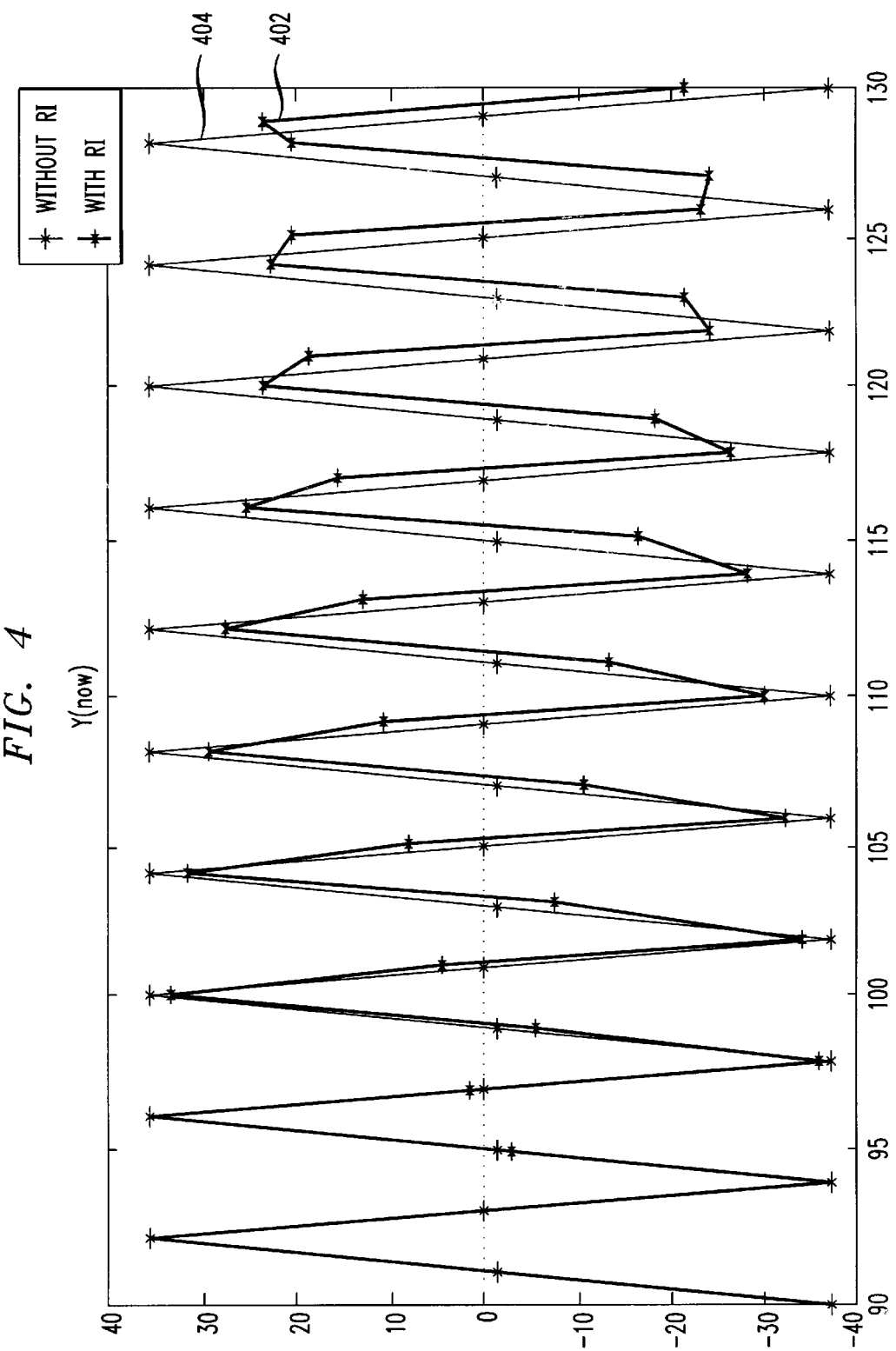
FIG. 4 is a diagram illustrating an input data signal with and without the effects of radial incoherence.

Quick phase changes occurring due to the effects of RI are illustrated in FIG. 4. It can easily be seen how the phase changes due to RI, illustrated by curve 402, as compared with an unimpaired signal, illustrated by curve 404. As shown in FIG. 4, to the extreme left of the graph, both curves (samples) 404 and 402 are on top of each other. As time progresses (to the right of the graph), the samples differ. Specifically, the samples differ because of the change in the sampling phase due to RI.

Faster seek times can be achieved in disk drives by increasing the servo track density (i.e., tracks are closer for higher density) and/or higher rotational speed of the disk (i.e., head moves faster over servo tracks). However, as the track density and the spin velocity increase, the effects of RI also increase.

A servo encoder in a magnetic recording system may map M input bits to N output bits. Thus, one can make use of the constraints imposed by the servo encoder and attempt to design an optimal detector based on those constraints to decode the servo data. A partial response maximum likelihood (PRML) detector also known as a Viterbi decoder (e.g., Viterbi decoder 108 in FIG. 1) is a well-known, widely used detector for decoding the encoded servo data. Other detectors for servo data may include peak detectors where the location and polarity of the peak (which are dependent on servo encoder constraints) serve to decode the data. These detectors yield very good performance when they use properly sampled signals for detecting the bits. However, the performance of these detectors degrades significantly when the samples are taken with timing errors.

For example, an M/N servo data encoder of a magnetic recording system is described in the U.S. patent application identified as Ser. No. 09/338,104, filed on Jun. 23, 1999, and entitled "Rate (M/N) Code Encoder, Detector, and Decoder for Control Data," the disclosure of which is incorporated by reference herein. While such an encoded PRML digital servo may perform satisfactorily in the absence of RI, performance degrades significantly when RI is present due to a lack of properly timed samples for detection.

Let us assume an EPR4 [5 5-5-5] partial response as a target response, and that M is 2 and N is 8. The ideal values (after equalization, sampling and digitizing) corresponding to the preamble, and the 2/8 encoded servo data are given below in Tables 1 and 2 for an EPR4 [5 5-5-5] target partial response. Note that these are the ideal sample values for 'T' symbol rate sampling of the equalized analog waveform.

TABLE 1

Preamble and corresponding A/D output stream
(Ideal Y Values) - EPR4 2/8

| Preamble | Y1 | Y2 | Y3 | Y4 |
|---|---|---|---|---|
| 11001100 | 0 | 20 | 0 | −20 |

TABLE 2

Data and corresponding A/D output stream
(Ideal Y Values)-EPR4 2/8

| Input bits | Coded bits | Y1 | Y2 | Y3 | Y4 | Y5 | Y6 | Y7 | Y8 |
|---|---|---|---|---|---|---|---|---|---|
| 00 | 00111100 | X | X | X | 20 | 10 | 0 | −10 | −20 |
| 11 | 11000011 | X | X | X | −20 | −10 | 0 | 10 | 20 |
| 01 | 00001111 | X | X | X | 0 | 10 | 20 | 10 | 0 |
| 10 | 11110000 | X | X | X | 0 | −10 | −20 | −10 | 0 |

In Table 2, X denotes that those values are dependent on the previous two input bits.

The preamble part of the servo field is used for acquiring the timing information by a DPLL. After the preamble, DPLL tracks the timing information during the servo data field. The 2/8 encoded SAM and Gray data is detected by a partial response maximum likelihood detector (Viterbi decoder) using the constraints imposed by the 2/8 encoder to improve reliability of the detected bits.

As described in the above-referenced U.S. patent application identified as Ser. No. 09/338,104, the relationship between the Viterbi trellis forcing phase sequence and the data stream has to be determined and initialized properly. Such a Viterbi trellis synchronization can be done easily by inserting a small number of pad bits between the preamble and SAM and detecting the end of preamble. The end of preamble can be detected simply and reliably by taking a filtered version of the received samples and performing a threshold detection on the filtered version.

However, conventional digital phase lock loops (DPLL) cannot react to quick phase changes resulting from RI due to implementation latencies. With increasing seek speeds and hence increasing effects of RI, it is clear that a DPLL cannot handle the RI problem. Even when a good signal-to-noise ratio (SNR) is available, current systems can not make use of such an SNR as these systems are limited because of RI and not by noise.

The present invention realizes these problems and provides techniques which effectively address them. As will be illustratively explained in detail below, the techniques of the invention employ multiple (i.e., two or more) data detectors for choosing between multiple sampling phases associated with the input data read from a magnetic recording medium. In this manner, the adverse effects of RI are mitigated and/or eliminated. Preferably, the multiple sampling phases are spaced T apart where T is the nominal spacing of the input samples. In the context of servo data on a disk of the recording medium, the Gray data coming from the detector which detected the SAM first is treated as the detected servo Gray data.

It is to be appreciated that the different phases of the incoming data on which the multiple data detectors look for the SAM need not be spaced exactly T apart. The different phases may be fractions of T (like T/2, for example) or multiples of T (like 2T, for example). Given the teachings herein, one of ordinary skill in the art will realize various other implementations.

For purposes of this illustrative description, we assume that the servo data encoding system with which the techniques of the present invention are implemented comprises a 2/8 servo encoder. For example, a magnetic recording system which may be modified such that the techniques of the invention are implemented therein is described in the above-referenced U.S. patent application identified as Ser. No. 09/338,104.

The present invention realizes that a servo channel employing a data detector such as a sequence detector or Viterbi detector needs to be synchronized to the block boundaries of the incoming data. Imperfect sampling due to RI can destroy this synchronization as well as corrupt the quality of the samples used for detection. The mis-synchronization to the block boundaries is the dominant effect which affects the performance of the servo SAM detection.

The present invention provides techniques to deal with the adverse effects of RI. More specifically, the invention provides for detecting the SAM associated with servo data using multiple data detectors which look for the SAM on different phases of the incoming data. These phases are preferably spaced T apart where T is the nominal spacing between samples. In one embodiment, in addition to a data detector employed to detect data at a nominal phase, two additional data detectors are employed which are spaced +T and −T relative to the nominal phase. The nominal phase is the phase initially believed to be the correct phase based on the synchronization which would normally be performed.

Recall that Tables 1 and 2 above illustrate ideal sample values for 'T' symbol rate sampling (nominal spacing) of the equalized analog waveform. The digital servo system of the invention provides for taking of samples T apart from one another, which is the symbol interval. Thus, as will be seen in accordance with FIG. 5 below, the nominal phase may be $kT+\phi$, where $\phi$ is known to be an initial sampling offset ranging between 0 and T. As far as how to determine which different phases of the incoming data to be considered by the other data detectors of the invention, +T and −T, mentioned above, represent just one example. If the effects of RI are relatively large, then the system may be configured to consider +2T and −2T. The system could also be configured to consider fractions of T, for example, +T/2 or −T/2. The system could oversample or interpolate to consider the different phases which are fractions of T.

The present invention thus realizes that, due to the timing errors arising from RI, the SAM may be found on a phase other than the nominal phase. Accordingly, the present invention provides for determining the SAM detection based on the first data detector to have detected the SAM.

Figure 5:
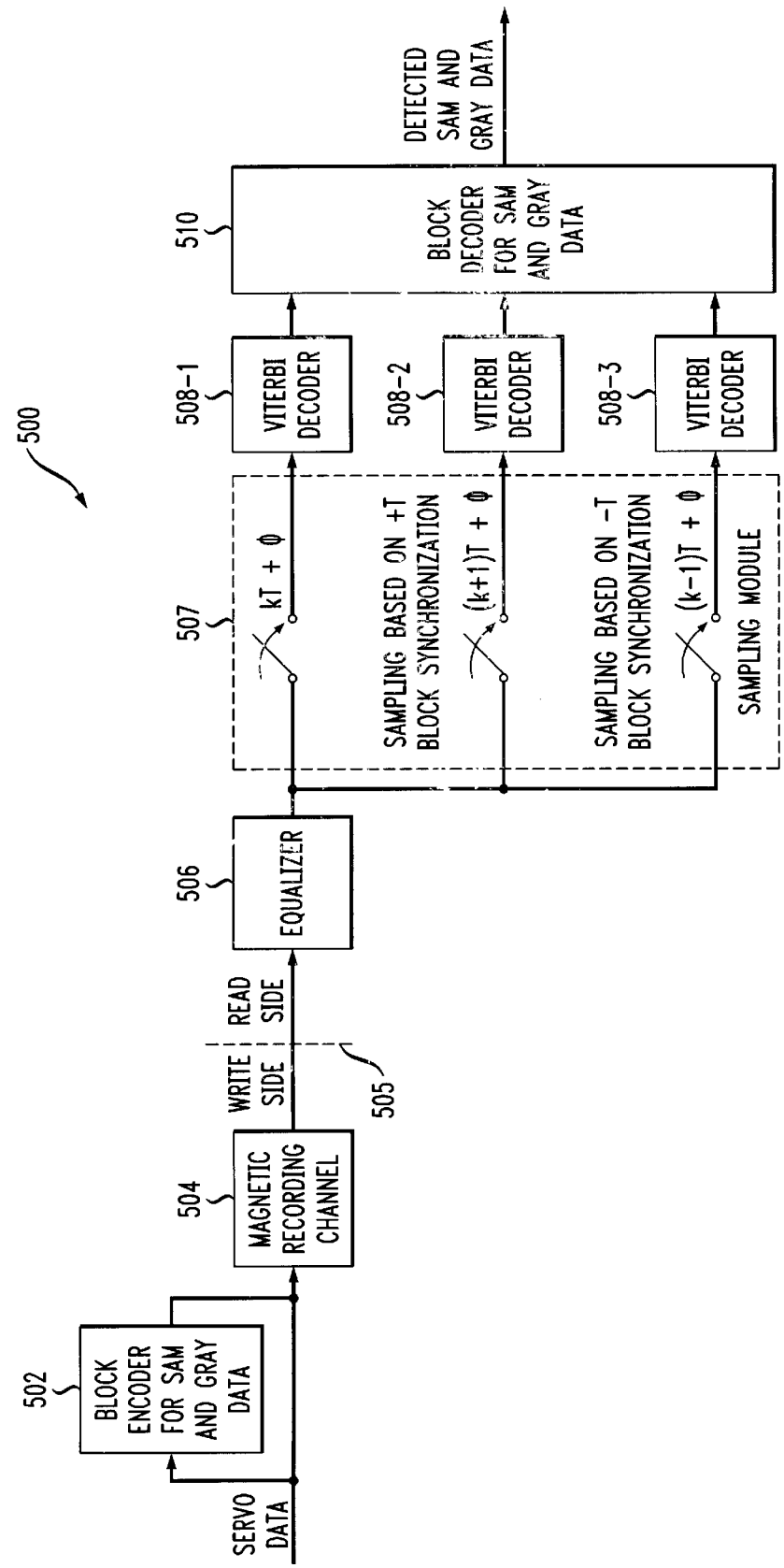
FIG. 5 is a block diagram illustrating a magnetic recording system according to one embodiment of the present invention.

Referring now to FIG. 5, a block diagram illustrates a magnetic recording system according to one embodiment of the present invention. It is to be understood that the system depicted in FIG. 5 is intended to illustrate the principles of the invention described above.

As shown, the magnetic recording system 500 comprises a servo data block encoder 502, a magnetic recording channel 504, an equalizer 506, a sampling module 507, Viterbi decoders 508-1 through 508-3, and a servo data block decoder 510.

It is assumed that the servo data has the same format as shown and described in the context of FIG. 2. Further, with the exception of servo data detection in accordance with the sampling module 507, the multiple Viterbi decoders 508-1 through 508-3, and the block decoder 510, the operations of the functional components shown in FIG. 5 perform the same operations as the functional components in FIG. 1 having like functional names.

Thus, on the write side of operations, servo data is encoded by the block encoder 502 and written to a magnetic medium such as a disk (denoted as 505) via the magnetic recording channel 504. As mentioned above, encoding may be in accordance with a 2/8 encoding scheme. Portions of the servo data that are not encoded may also be written to the medium 505. Again, it is understood that a magnetic write head, while not expressly shown, is functionally interposed between the magnetic recording channel 504 and the magnetic medium 505 for writing data to the medium. On the read side of operations, the servo data is read from the magnetic medium 505 via a magnetic read head (not expressly shown but understood to be functionally interposed between the medium 505 and the equalizer 506) and then equalized in accordance with the equalizer 506.

In accordance with the principles of the present invention, the input data read from the magnetic recording medium is sampled in sampling module 507. As shown, the input data is sampled in the sampling module 507 at different phases. These phases are preferably spaced T apart where T is the nominal spacing between samples. Thus, in this illustrative embodiment, the input data is sampled at a nominal phase represented as $kT+\phi$. Sampling at such a phase represents sampling based on nominal block synchronization. Further, the input data is sampled at a phase represented as $(k+1)T+\phi$. Sampling at such a phase represents sampling based on +T block synchronization. Still further, the input data is sampled at a phase represented as $(k-1)T+\phi$. Sampling at such a phase represents sampling based on −T block synchronization. Accordingly, in addition to sampling at the nominal phase, which is the phase initially believed to be the correct phase based on the synchronization which would normally be performed, the input data is sampled at two additional phases which are spaced +T and −T relative to the nominal phase.

It is to be understood that while the above description of the operation of sampling module 507 refers to the input data being sampled at the different phases and the figure illustrates individual sampling units within module 507, the samples generated at a phase other than the nominal phase (e.g., the samples generated based on +T block synchronization and the samples generated based on −T block synchronization) may be generated by using delay lines to simply delay the samples generated at the nominal phase, thereby yielding the samples at the phases other than the nominal phase. Thus, the term "sampling," as used herein may be more generally understood as referring to the operation of generating samples.

Next, the $kT+\phi$ sampled data is provided to the Viterbi decoder 508-1, the $(k+1)T+\phi$ sampled data is provided to the Viterbi decoder 508-2, and the $(k-1)T+\phi$ sampled data is provided to the Viterbi decoder 508-3. Each Viterbi decoder then detects, in a conventional manner, the servo data from the input data at its respective phase.

The Gray data coming from the Viterbi decoder which detected the SAM first is selected as the detected servo Gray data. In this embodiment, the term "first" refers to first in time. That is, whichever detector detected the SAM first in time is used for detecting the Gray data. It is to be understood that, ideally, the other detectors should not detect the SAM as they are not block synchronized properly. Thus, only one of the detectors should detect the SAM. In any case, in the event that other detectors also detect the SAM, the first one to detect is used.

The selected Gray data portion is then decoded, in a conventional manner, by the block decoder 510 during a seek mode. While not expressly shown, it is to be understood that the burst demodulation field portion of the servo data coming from the Viterbi decoder which provided the Gray data is demodulated by a burst demodulator.

As mentioned above, the different phases of the incoming data on which the multiple data detectors look for the SAM need not be spaced exactly T apart. That is, the different phases may alternatively be fractions of T (like T/2, for example) or multiples of T (like 2T, for example).

Also, while three data detectors are used in the embodiment of FIG. 5, it is to be understood that two, four, or more data detectors may be used. That is, in the case of two data detectors, the incoming data may be sampled at the nominal phase and at some other selected phase. In the case of four or more data detectors, the incoming data may be sampled at the nominal phase and at three or more other selected phases.

Advantageously, the servo data detection techniques of the present invention improve seek time in magnetic recording systems. That is, since the techniques of the invention effectively provide mechanisms for overcoming the quick phase changes and signal loss associated with radial incoherence, faster disk seeks are possible. Also, tracks can be written closer and the disks can be spun faster with the application of techniques of the present invention. Moreover, the mis-synchronization to the block boundaries caused by RI that affects the performance of conventional servo SAM detection is advantageously overcome with the application of techniques of the present invention.

It is to be appreciated that the functional elements of the read side of the magnetic recording system 500 in FIG. 5 may be implemented in accordance with a processor and associated memory. That is, one or more of the equalizer 505, the sampling module 507, the Viterbi decoders 508-1 through 508-3, the block decoder 510, and the burst demodulator (not shown) may be implemented as such. The processor and memory may preferably be part of a digital signal processor (DSP) used to implement the read channel. However, it is to be understood that the term "processor" as used herein is generally intended to include one or more processing devices and/or other processing circuitry. For example, the invention may be implemented as an application-specific integrated circuit (ASIC) or as another type of integrated circuit, e.g., a read channel integrated circuit. The term "memory" as used herein is generally intended to include memory associated with the one or more processing devices and/or circuitry, such as, for example, RAM, ROM, a fixed and removable memory devices, etc.

Accordingly, software components including instructions or code for performing the methodologies of the invention, as described herein, may be stored in the memory associated with the read channel processor and, when ready to be utilized, loaded in part or in whole and executed by one or more of the processing devices and/or circuitry of the read channel processor.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of detecting control data from input data stored on a recording medium, the method comprising the steps of:

respectively sampling the input data read from the recording medium at two or more predetermined phases;

respectively applying the input data sampled at the two or more predetermined phases to two or more data detectors; and identifying output data from one of the two or more data detectors as detected control data based on a predetermined detection criterion.

2. The method of claim 1, wherein the input data is stored on tracks of the recording medium and the control data is detected therefrom in the presence of timing offsets existing between radially adjacent tracks of the recording medium.

3. The method of claim 1, wherein the detector output data identified as detected control data is subsequently decoded.

4. The method of claim 3, wherein the decoded control data is subsequently used for reading information from the recording medium.

5. The method of claim 1, wherein the control data is servo sector data stored on the recording medium.

6. The method of claim 5, wherein the predetermined detection criterion comprises identifying output data from the first data detector to detect a servo address mark in the input data.

7. The method of claim 1, wherein the two or more predetermined phases used to sample the input data comprise a nominal phase and at least one phase other than the nominal phase.

8. The method of claim 7, wherein the at least one phase other than the nominal phase is spaced T apart from the nominal phase, where T is a nominal spacing associated with input samples.

9. The method of claim 7, wherein the at least one phase other than the nominal phase is spaced a multiple of T apart from the nominal phase, where T is a nominal spacing associated with input samples.

10. The method of claim 7, wherein the at least one phase other than the nominal phase is spaced a fraction of T apart from the nominal phase, where T is a nominal spacing associated with input samples.

11. The method of claim 1, wherein the two or more data detectors are partial response maximum likelihood detectors.

12. The method of claim 1, wherein the two or more data detectors are Viterbi decoders.

13. A method for use in accordance with a read channel for detecting servo data from input data stored on tracks of a magnetic recording medium in the presence of timing offsets existing between radially adjacent tracks of the magnetic recording medium, the control data being for subsequent use in reading user data from the magnetic recording medium, the method comprising the steps of:

respectively sampling the input data read from the magnetic recording medium at two or more predetermined phases, the two or more phases comprising a nominal phase and a phase spaced apart from the nominal phase by a value T or by a function of the value T;

respectively applying the input data sampled at the two or more predetermined phases to two or more partial response maximum likelihood detectors; and identifying output data from one of the two or more partial response maximum likelihood detectors as detected servo data based on which detector is first to detect a servo address mark in the input data.

14. Apparatus for processing control data from data stored on a recording medium, the apparatus comprising:

a sampling module, operatively coupled to the recording medium, for respectively sampling data read from the recording medium at two or more predetermined phases;

two or more data detectors, operatively coupled to the sampling module, for respectively performing data detection on the data sampled at the two or more predetermined phases; and a control data decoder, operatively coupled to the two or more detectors, for identifying output data from one of the two or more data detectors as detected control data based on a predetermined detection criterion, the identified output data then being decoded for subsequent use in reading user data from the recording medium.

15. The apparatus of claim 14, wherein the data is stored on tracks of the recording medium and the control data is detected therefrom in the presence of timing offsets existing between radially adjacent tracks of the recording medium.

16. The apparatus of claim 14, wherein the control data is servo sector data stored on the recording medium.

17. The apparatus of claim 14, wherein the two or more predetermined phases used to sample the data comprise a nominal phase and at least one phase other than the nominal phase.

18. The apparatus of claim 14, wherein the two or more data detectors are partial response maximum likelihood detectors.

19. An integrated circuit, comprising:

a sampling module, operatively coupled to a recording medium, for respectively sampling data read from the recording medium at two or more predetermined phases;

two or more data detectors, operatively coupled to the sampling module, for respectively performing data detection on the data sampled at the two or more predetermined phases; and a control data decoder, operatively coupled to the two or more detectors, for identifying output data from one of the two or more data detectors as detected control data based on a predetermined detection criterion, the identified output data then being decoded for subsequent use in reading user data from the recording medium.

20. An integrated circuit for detecting control data from input data stored on a recording medium, the integrated circuit operative to perform operations comprising:

respectively sampling the input data read from the recording medium at multiple predetermined phases;

respectively performing data detection on the input data sampled at the multiple predetermined phases; and identifying output data from one of the multiple data detection operations as detected control data based on a predetermined detection criterion.

21. A method of detecting control data from data stored on a recording medium, the method comprising the steps of:

respectively generating samples from the input data read from the recording medium at two or more predetermined phases;

respectively applying the samples generated at the two or more predetermined phases to two or more data detectors; and identifying output data from one of the two or more data detectors as detected control data based on a predetermined detection criterion.

22. A method of detecting data from input data received from a transmission medium, the method comprising the steps of:

respectively generating samples from the input data received from the transmission medium at two or more predetermined phases;

respectively applying the samples generated at the two or more predetermined phases to two or more data detectors; and identifying output data from one of the two or more data detectors as detected data based on a predetermined detection criterion.

* * * * *